June 26, 1962
D. E. STEM
3,040,896
MAGNETIC TRAP FOR CONDUITS
Filed Oct. 13, 1958
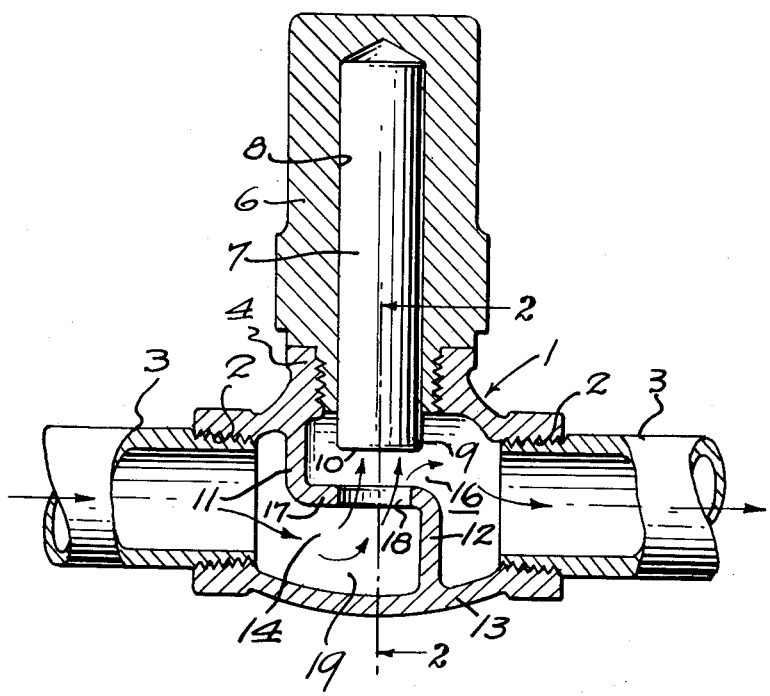
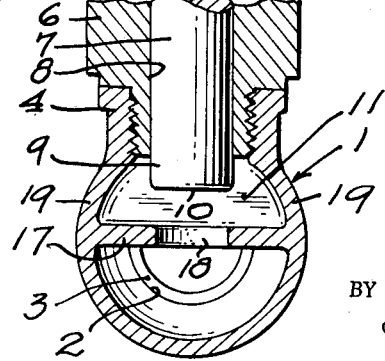
INVENTOR.
DONALD E. STEM
BY George B. White
ATTY.

United States Patent Office 3,040,896
Patented June 26, 1962

---

3,040,896
MAGNETIC TRAP FOR CONDUITS
Donald E. Stem, 4025-37 Sebastopol Highway,
Santa Rosa, Calif.
Filed Oct. 13, 1958, Ser. No. 766,885
2 Claims. (Cl. 210—222)

This invention relates to a magnetic trap for conduits.

An object of the invention is to provide a magnetic trap wherein a permanent magnet is interposed in the conduit generally at right angles to the axis of the conduit and means are provided for diverting the flow opposite said magnet so as to impinge the liquid axially against, as well as around, the end of the magnet, and direct the entire flow through the magnetic field of said magnet, thereby to trap magnetic particles from the liquid without materially retarding the flow through the conduit.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a sectional view of my magnetic trap.

FIG. 2 is a fragmental cross-sectional view of my trap, the section being taken on lines 2—2 of FIG. 1.

My magnetic trap includes a non-magnetic hollow body 1, which has axially opposite threaded ports 2 to which correspondingly threaded ends of conduits or pipes 3 may be coupled. Thus the body by the threads couples the ends of pipes 3 together.

The body 1 is globular and has an internally threaded boss 4 at about the middle of the body and at right angles to the axis of the threaded ports 2.

A non-magnetic plug 6 is screwed into the boss 4. A generally cylindrical permanent magnet 7 is fixedly held, preferably by press fit, in a central bore 8 of the plug 6 so that the inner end 9 of the magnet 7 projects into the hollow body, generally at right angles to the axis of said threaded ports 2.

The interior of the hollow body 1 has partition walls therein so arranged as to direct the flow of liquid at right angles toward the flat end face 10 of the magnet 7. A partition wall 11 extends from the top of the body 1 downwardly between the adjacent threaded port 2 and the boss 4 transversely of the body so as to shield the magnet end 9 from the in-flow. A baffle wall 12 extends from the bottom 13 of the body 1 and transversely across the interior of the body 1 to obstruct flow toward the other port 2. The lower end of the partition wall 11 is spaced from the bottom 13 so as to provide an intake chamber 14. The baffle wall 12 is spaced from the boss 4 so as to provide an outlet chamber 16. An axial wall 17 connects the inner ends of the partition wall 11 and baffle wall 12.

This axial wall 17 is opposite the inner end 9 of the permanent magnet 7 and it has a passage or hole 18 opposite to and spaced from the flat face 10 of the magnet 7 so as to direct flow axially to said magnet 7. The outlet chamber 16 surrounds the projecting end 9 of the maget 7 so as to cause the liquid to flow around said magnet end 9 as the direction of flow is changed generally at right angles into the outlet chamber 16.

In operation the body 1 is coupled between the ends of pipes or conduits, as shown, and as the liquid flows through the body 1, it changes direction from the intake chamber 14, as directed by the baffle wall 12, at about right angles to its inflow and through the passage hole 18 against and around the magnet end 9 and then the flow changes direction again at right angles to the initial axial direction. During the flow of the liquid against and about the magnet end 9 its particles effectively approach or impinge upon the magnet end 9 so that all the liquid passes through the magnetic field, and metallic particles are attracted from the liquid and collected on the magnet end 9. It is to be noted that the spacing of the magnet end 9 from the partition wall 11 and from the axial wall 17 and from the side walls 19 of the body is such that the entire area or chamber above the hole 18 is within the intensive magnetic field of the magnet end 9. In order to clean the magnet, the plug 6 is removed and after cleaning the magnet end 9, the plug 6 is easily replaced.

I claim:

1. A magnetic trap for collecting magnetic particles from a substance flowing through conduits comprising a hollow body having parts adapted to interconnect said conduits, baffle means in said body for directing the substance flowing through said body and such conduits to flow for at least a short distance in a direction at an angle with the flow path of such conduits, said baffle means including spaced transverse walls extended from opposite walls of said body inwardly between the ports forming a chamber adjacent each port, and a connecting wall between the transverse walls of said ports and having an opening therethrough at a point where flow is directed at an angle with such conduits to divert the flow therethrough from one chamber to the other, a removable plug seated in said body in opposition to said opening, a permanent bar magnet seated in and projecting from said plug at right angles to said connecting wall, said magnet being coaxial with and in close proximity to said opening so that the entire diverted flow is within the intense portion of the magnetic field of said magnet, the diameter of said magnet being slightly greater than the diameter of said opening to assure that the flowing substance will flow in close proximity to the end of the magnet where the magnetic force is the greatest, whereby effective magnetic particle removal is accomplished.

2. The magnetic trap defined in claim 1, wherein the plane of the projecting end of said magnet is parallel to the plane of said opening.

References Cited in the file of this patent

UNITED STATES PATENTS

| 2,466,304 | Cooney | Apr. 5, 1949 |
| 2,603,353 | Cooney | July 15, 1952 |
| 2,800,230 | Thoma | July 23, 1957 |

FOREIGN PATENTS

| 1,062,684 | France | Apr. 26, 1954 |